US012596544B2

(12) United States Patent
White et al.

(10) Patent No.: US 12,596,544 B2
(45) Date of Patent: Apr. 7, 2026

(54) DEPLOYMENT OF UPDATES AT MULTIPLE SITES

(71) Applicant: MICROSOFT TECHNOLOGY LICENSING, LLC, Redmond, WA (US)

(72) Inventors: Peter Louis White, Redmond, WA (US); Calum Sutherland Loudon, Edinburgh (GB); Olga Arkhangelskaia, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 140 days.

(21) Appl. No.: 18/324,807

(22) Filed: May 26, 2023

(65) Prior Publication Data

US 2024/0289114 A1     Aug. 29, 2024

Related U.S. Application Data

(60) Provisional application No. 63/486,866, filed on Feb. 24, 2023.

(51) Int. Cl.
*G06F 8/65* (2018.01)

(52) U.S. Cl.
CPC ..................................... *G06F 8/65* (2013.01)

(58) Field of Classification Search
CPC ....................................................... G06F 8/65
USPC ................................................. 717/168–178
See application file for complete search history.

(56) References Cited

U.S. PATENT DOCUMENTS

| | | | | |
|---|---|---|---|---|
| 6,681,389 | B1 * | 1/2004 | Engel ...................... | G06F 8/656 |
| | | | | 717/173 |
| 7,620,707 | B1 * | 11/2009 | Sutherland ................ | G06F 8/65 |
| | | | | 709/202 |
| 7,865,888 | B1 * | 1/2011 | Qureshi ................. | G06N 5/048 |
| | | | | 717/170 |
| 8,316,120 | B2 * | 11/2012 | Gouge ................ | G06F 9/45558 |
| | | | | 717/173 |
| 8,572,679 | B1 * | 10/2013 | Wang .................. | H04L 41/0813 |
| | | | | 370/328 |
| 9,229,902 | B1 * | 1/2016 | Leis .......................... | G06F 8/65 |
| 9,645,808 | B1 * | 5/2017 | Turpie ................ | G06F 11/3672 |
| 9,959,111 | B2 * | 5/2018 | Plate ......................... | G06F 8/65 |

(Continued)

FOREIGN PATENT DOCUMENTS

| | | |
|---|---|---|
| WO | 2021150307 A1 | 7/2021 |
| WO | 2024019833 A1 | 1/2024 |

OTHER PUBLICATIONS

Singh et al, "Characterizing the Deployment and Performance of Multi-CDNs", ACM, pp. 1-7 (Year: 2018).*

(Continued)

*Primary Examiner* — Anil Khatri

(74) *Attorney, Agent, or Firm* — Han Gim; Newport IP, LLC

(57) ABSTRACT

Techniques are described for orchestrating an update to a computing network comprising a plurality of sites each comprising a plurality of computing nodes implementing a virtualized computing network managed by an orchestrator. The update is performed by a network manager configured to execute a series of operations in the virtualized computing network that coordinates the update at the plurality of sites.

17 Claims, 7 Drawing Sheets

(56) References Cited

U.S. PATENT DOCUMENTS

| | | | | |
|---|---|---|---|---|
| 9,973,385 | B2 * | 5/2018 | Wright | G06F 9/44505 |
| 10,893,116 | B1 * | 1/2021 | Koehler | H04L 41/0806 |
| 11,194,566 | B1 * | 12/2021 | Gabrielson | G06F 11/3692 |
| 11,204,756 | B1 * | 12/2021 | Samuel | G06F 8/65 |
| 2015/0319096 | A1 * | 11/2015 | Yip | H04L 43/0811 |
| | | | | 709/224 |
| 2019/0369980 | A1 | 12/2019 | Mair | |
| 2021/0036914 | A1 | 2/2021 | Nissimoff et al. | |
| 2021/0055947 | A1 | 2/2021 | Mahajan | |
| 2022/0214998 | A1 * | 7/2022 | Mutnuru | H04L 41/0816 |
| 2024/0031226 | A1 * | 1/2024 | Loudon | H04L 41/082 |

OTHER PUBLICATIONS

Gkantsidis et al, "Planet Scale Software Updates", ACM pp. 1-12 (Year: 2006).*
Liao et al, "DeployFix: Dynamic Repair of Software Deployment Failures via Constraint Solving", ACM, pp. 1-12 (Year: 2024).*
Huang et al, "Testing for Dynamic Software Update: An Object-State-Oriented Approach", ACM, pp. 1-10 (Year: 2021).*
Reitblatt et al, "Abstractions for Network Update", ACM, pp. 1-12 (Year: 2012).*
International Search Report and Written Opinion received for PCT Application No. PCT/US2024/016335, Jun. 12, 2024, 19 pages.
International Preliminary Report on Patentability (Chapter I) received for PCT Application No. PCT/US2024/016335, Sep. 4, 2025, 13 pages.

* cited by examiner

Service Provider
400

Network Manager

410

Provided Networks

420

Network 430

Customer Environment
440

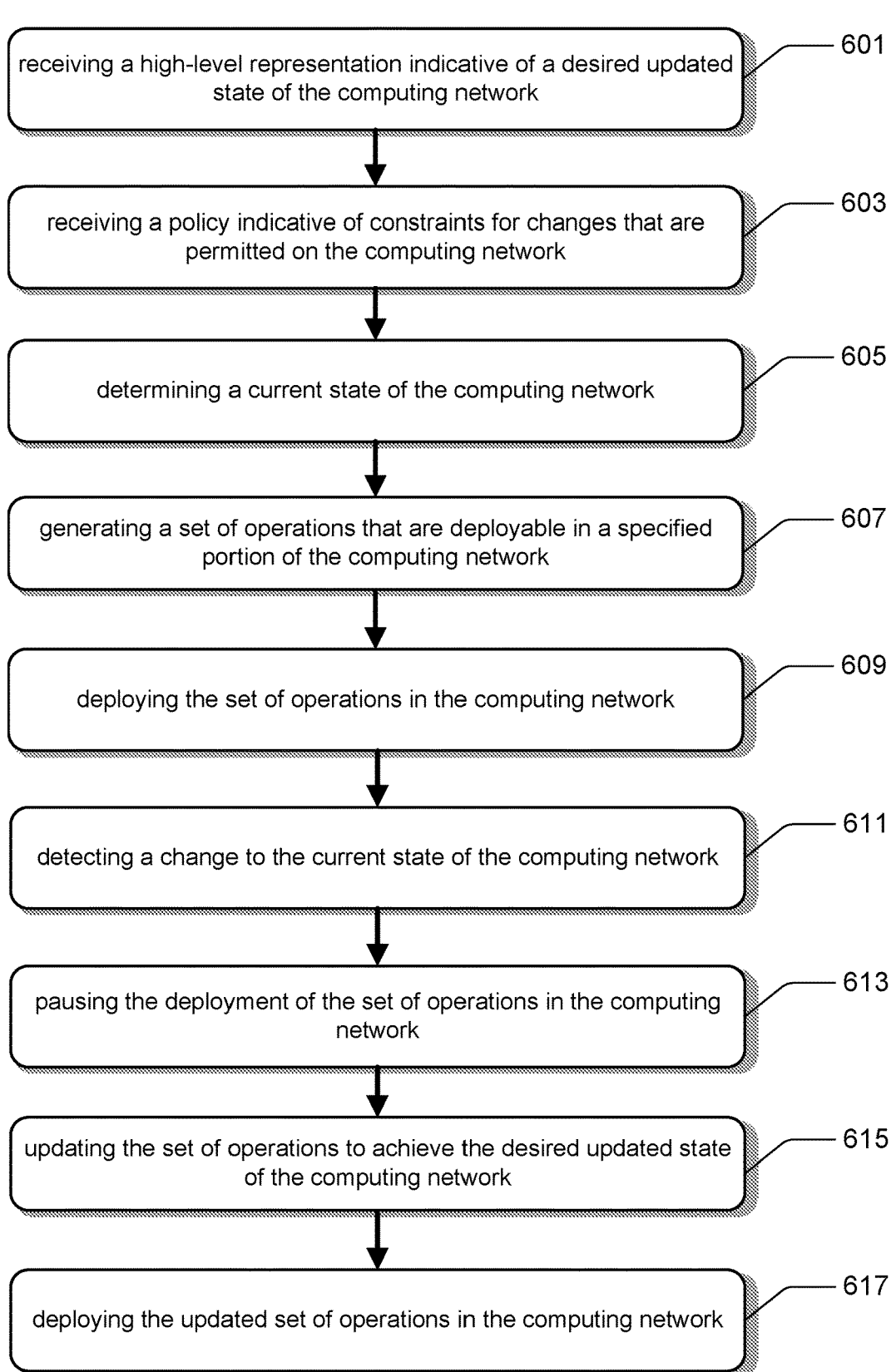

600

601 — receiving a high-level representation indicative of a desired updated state of the computing network 603 — receiving a policy indicative of constraints for changes that are permitted on the computing network 605 — determining a current state of the computing network 607 — generating a set of operations that are deployable in a specified portion of the computing network 609 — deploying the set of operations in the computing network 611 — detecting a change to the current state of the computing network 613 — pausing the deployment of the set of operations in the computing network 615 — updating the set of operations to achieve the desired updated state of the computing network 617 — deploying the updated set of operations in the computing network

DEPLOYMENT OF UPDATES AT MULTIPLE SITES

PRIORITY APPLICATION

This application claims the benefit of and priority to U.S. Provisional Application No. 63/486,866, filed Feb. 24, 2023, the entire contents of which are incorporated herein by reference.

BACKGROUND

Service providers can provide computing services to businesses and individuals as a remote computing service or provide "software as a service" (e.g., cloud computing). In some cases, deployed products and services from service providers may be updated. The products and services are often deployed over multiple sites, which can make the deployment complex and time-consuming. Furthermore, the updates may have overlapping scope, making it difficult for the operator to manage and implement such updates. Such complexities can result in various issues resulting in deployment delays, which in turn can prevent users of the service provider from providing services to their downstream users. This can lead to lost revenue and customer dissatisfaction.

It is with respect to these considerations and others that the disclosure made herein is presented.

SUMMARY

The disclosed embodiments describe technologies for defining high-level abstractions for stating intent for large-scale networked systems, where a sequence of operations to achieve the statement of intent is generated. The technologies allow for the separation of intent from details of a given rollout of a product or update, which allows an operator to express a much simpler and higher-level expression of what changes are to be achieved which in turn is transformed into a detailed specification of steps needed to achieve the statement of intent. In other words, the higher-level expression is abstracted from underlying details of user-specific configurations of a network.

The disclosed embodiments enable an operator, for example, to avoid having to keep track of or reconfigure configuration changes which are in process when new changes are deemed to be more urgent. For example, an update that is to be rolled out at multiple sites across a region may take several weeks or months, during which another change may be required at a faster rate due to an urgency such as a security issue. Another example is that of a configuration change that is deployed simultaneously with the rolling out of a major software change, with the configuration change being an unrelated configuration that is scheduled to occur at a faster rate. The current rollout may then need to be paused to accommodate the intervening change, since the current rollout will need to be tested and verified against the change. This will require the operator who initiated the current rollout to cancel the current rollout and restart the current rollout after the intervening change has completed, while reconfiguring the current rollout as needed to address the intervening change. However, the original high-level intent of the current rollout does not change. By separating the high-level intent from the lower-level details, the operator can be shielded from a significant amount of detailed configuration and reconfiguration effort. The disclosed embodiments enable the generation of the detailed rollout specifications, where the operator can confirm the generated rollout specifications to proceed with an updated rollout to continue the application of the original major update.

In an embodiment, statements of intent can be interpreted by a rollout management engine which is configured to obtain information about the current state of the target network over all of the sites identified for the rollout, and verify the states and changes needed to update the states based on the statements of intent. The rollout management engine may use inputs provided by the operator, and in some embodiments the rollout management engine may use machine learning to process the statements of intent.

The described techniques can allow for a service provider or user to more efficiently deploy and manage computing resources while maintaining efficient use of computing capacity such as processor cycles, memory, network bandwidth, and power.

This Summary is provided to introduce a selection of concepts in a simplified form that are further described below in the Detailed Description. This Summary is not intended to limit the scope of the claimed subject matter.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 6 is a flowchart depicting an example procedure in accordance with the present disclosure;

DETAILED DESCRIPTION

Figure 1:
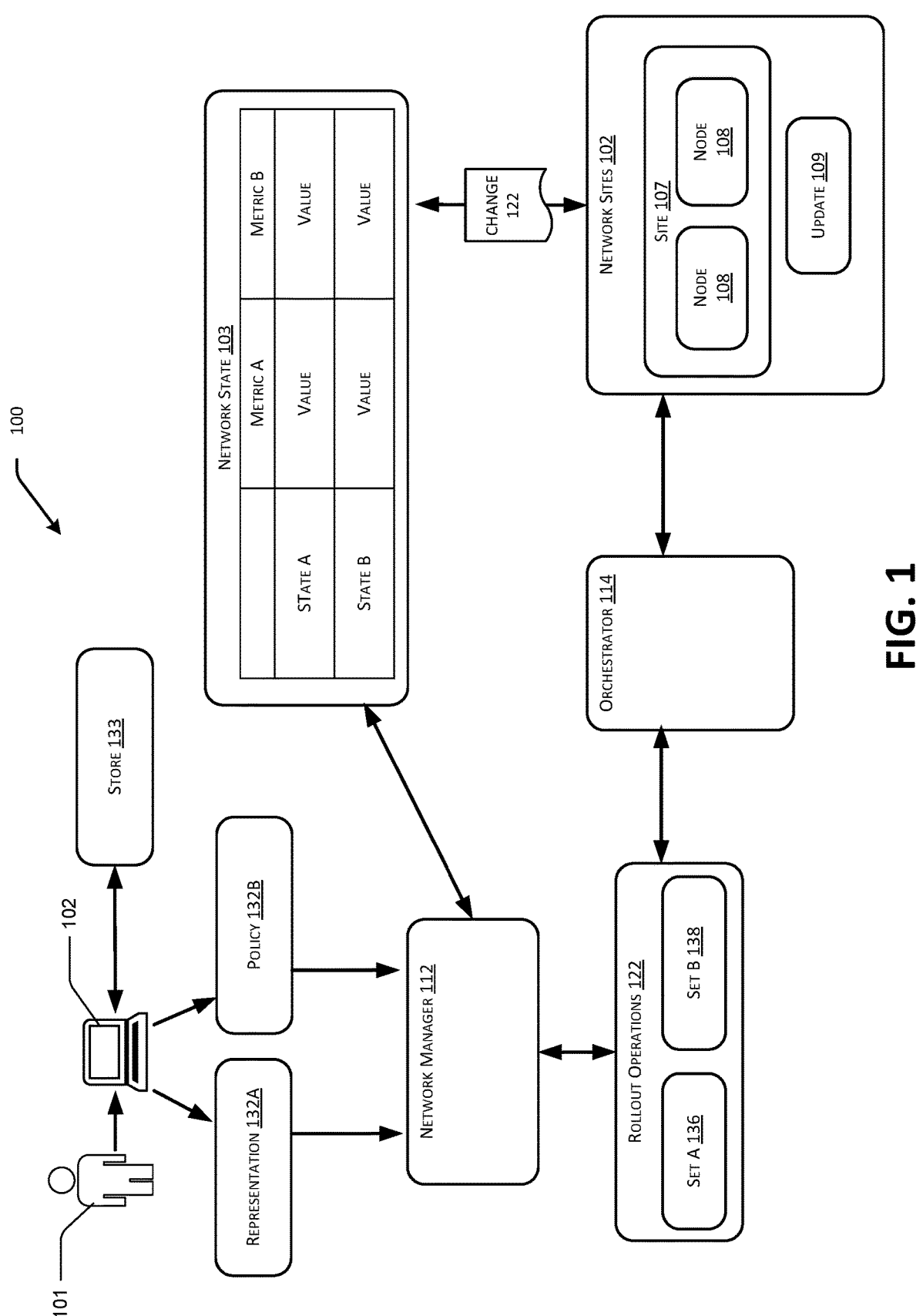
FIG. 1 is a diagram illustrating an example architecture in accordance with the present disclosure.

The disclosed embodiments describe technologies for efficiently describing, allocating, or creating various resources related to deploying software updates across a plurality of sites in a distributed network. The embodiments provide for the changes implemented by the deployment to be safe (e.g., avoids crashes, loss of functionality, etc.) and visible (e.g., allowing operators to view status of the deployment), while allowing the operator to maintain control over the changes using a high-level intent-based mechanism that allows for the operator's inputs to be focused on intent and goals rather than specific actions pertaining to what, where, and how an update is to be deployed.

In one embodiment, a rollout management engine enables an operator to set only the desired state of the system to effect a desired change. The rollout management engine automatically creates a scenario of how the change is to be propagated, and which set of actions to apply to safely deploy the change.

In one embodiment, the rollout management engine provides an interface to enable an operator to provide input information for the high-level statement of intent. The rollout management engine, based on the input information received, generates details for deploying the rollout. In an embodiment, the details for deploying the rollout can include a step-by-step guide of how to deploy change to the applicable data centers/regions.

In one embodiment, the rollout management engine is part of a system for orchestrating a change to a network. The system for orchestrating the change can be implemented on one or more servers in a data center. In an embodiment, the network comprises at least two computing nodes, which can include servers, clusters of servers, deployments within a data center, and the like, and network devices such as gateways. The change to the network is represented by at least one configuration which indicates the desired state of the network.

In an embodiment, one or more policies are referenced or accessed, from which optimal and permitted changes to the network can be derived. In an embodiment, at least one central element or node in the network is configured to access the current state of the network. The central element or node combines the configuration and policy with the current state of the network and generates a series of discrete steps to modify the network so as to move the network towards the state indicated by the at least one configuration which indicates the desired state of the network.

The central element or node may host the rollout management engine as described further herein. The central element or node is configured to run multiple iterations if the network changes. The scope of the network changes can vary. For example, the central element or node can orchestrate changes of varied scope, where multiple devices such as servers can be affected for full or partial deployments and across multiple data centers and edge sites. The rollout management engine receives declarative statements and policies relevant to a desired deployment. The rollout management engine converts declarative statements and the policies to generate the set of steps that are to be applied to execute the deployment. The operator can run the rollout management engine multiple times for a given set of declarative statements and the policies. Each time that the rollout management engine is executed for a given set of intent statements, the generated steps can change depending on if the central element or node has identified any changes to the network that impact the desired deployment. The rollout management engine process can be rerun as needed. In some alternative embodiments, the rollout management engine process can be implemented as a continuous running agent.

In an example, the declarative statements can be provided as a JavaScript Object Notation (JSON) file that defines parameters that indicate the current state, the desired state, and applicable policies. The rollout management engine can generate a set of declarative steps by reading the policy and implement the policy when generating the declarative steps, for example policies pertaining to timing requirements, health checks, and rollout scenarios. Rollout scenarios can include initial deployment zones for a canary deployment, and whether rollout to zones is to be performed serially or in parallel.

In an embodiment, the operator can stop a rollout in progress and regenerate/restart the rollout. During the regeneration process, the rollout management engine determines what actions have already been implemented. The rollout management engine uses the intent and policy as well as the current state to regenerate the rollout process and continue the rollout process, from a different starting point if needed. In this way, the operator can stop a rollout, implement other changes to the system as a whole, and still be able to track the underlying intent of the rollout. This can be beneficial, for example, if a security patch is released and it is desired to incorporate a version that includes the patch. It is important to stop a rollout when an intervening set of changes is applied in another rollout. Rolling out multiple changes at once should be avoided as the changes may cause simultaneous failures or conflicts, and the changes may clash (e.g., a single site/server should not simultaneously apply a major software upgrade and a patch). In an embodiment, a consistency check of the computing network may be performed to verify that the intent can be effected in the network without conflicts or incompatibilities.

The intent of the rollout can be updated while maintaining the original rollout intent without the patch. Thus, the rollout management engine allows for the intent to be evolved to include changes during the rollout process, enabling the operator to specify high-level intent without specifying individual low-level changes in the network. The rollout management engine, using information received from the central element or node, uses the latest information regarding the topology of the network, including the various components that are to be updated, the configuration of the servers and edge zones, and network conditions as informed by policies are constraints such as delays, health checks, canary deployments, and rollout sequence.

FIG. 1 illustrates an example computing environment 100 that implements the separation of intent and the generation of individual instructions for effecting the intent, in an embodiment. An operator 101 is able to set the intent of the change to a system managed by orchestrator 114 by inputting an intent component via a computing device 102 that is indicated by representation 132A. Other input can be included such as policy 132B and network state 103. In an embodiment, intent components may be selected from a store 133 of previously created and saved intent components. The intent as indicated by the representation 132A specifies what declarative configuration end state is desired, what service instances 109 are to be affected, and what set of policies and rules are to be followed. In an embodiment, the intent can be represented in a configuration file. The configuration can include a policy indicative of constraints for changes that are permitted in the network and a current state of the network. As used herein, the rollout management engine may also be referred to as a network manager 112. The rollout management engine (network manager 112 as shown in FIG. 1) then uses the specification of intent to determine how the associated changes will be propagated and which set of actions to apply in order to safely implement the change. The rollout is generated as a set of rollout operations 122 that can include set A 136 and set B 138 and provides a step-by-step guide of how to implement the intent to every network service instance 109 in each of the affected regions such as site 107, which in this example includes nodes 108. In some embodiments, the network manager 112 can include a mapping component configured to configured to translate the representation 132A to the rollout operations 122.

Figure 2:
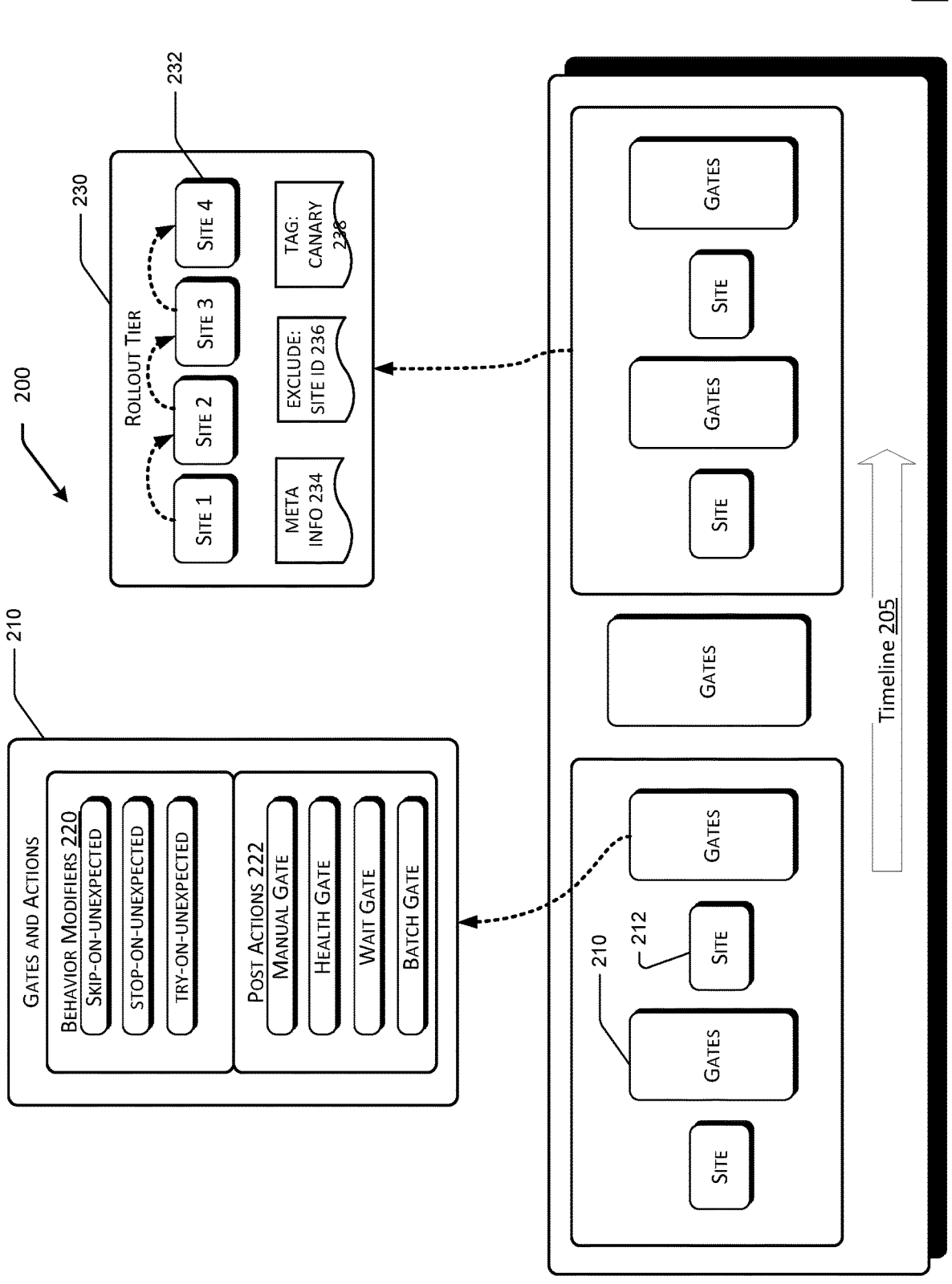
FIG. 2 is a diagram illustrating an example architecture in accordance with the present disclosure.

FIG. 2 illustrates an example of a rollout script 200 as generated by the rollout management engine or network manager 112, including a timeline 205 of detailed instructions for implementing the specified intent and policy, including the different computing resources that are affected and the order in which to implement the changes. The detailed instructions include a detailed sequencing of steps that are generated based on intent objects that are derived from the specified intent.

In an embodiment, the rollout script definition referenced in the intent includes one or more of resources, update order, and an ordered list of tiers 230 for the rollout sites 232 and metadata 234, site IDs to exclude 236, and canary tags 238 for identifying a canary deployment. The rollout script 200 provides an update specification object that can be used to trigger the desired rollout and defines the steps to implement the rollout. In an example, the rollout script 200 can include steps to be implemented at a given site. The steps can be implemented for instances of the service or function that is to be updated. Such instances can be referred to as a site service or a site network service. The steps can include gates 210 between sites 212. Gates 210 can refer to decision points as to whether the rollout should proceed, and can include behavior modifiers 220 which indicate how the rollout should react to errors and unexpected states, all of which are derived from the rollout script definition referenced in the intent. The gates 210 can include post actions 222 to indicate whether a gate is manual, or if a health check is to be performed, whether a wait period should be implemented, and whether some parts of the update should be batched.

An internal service can be triggered once the rollout is created to execute the rollout. The internal service can be the rollout management engine or another internal service configured to execute the rollout. If the rollout is paused or stopped for any reason, for example, an option is provided to identify the cause of the pause or stoppage. Further options can be provided to modify the rollout, cancel the rollout, recover the rollout, or other options. For example, an emergency patch may need to be implemented, or one of the target sites may be offline. The operator can perform these actions without having to configure the underlying details of the target sites. The rules and instructions are generated automatically based on the statements of intent.

Figure 3:
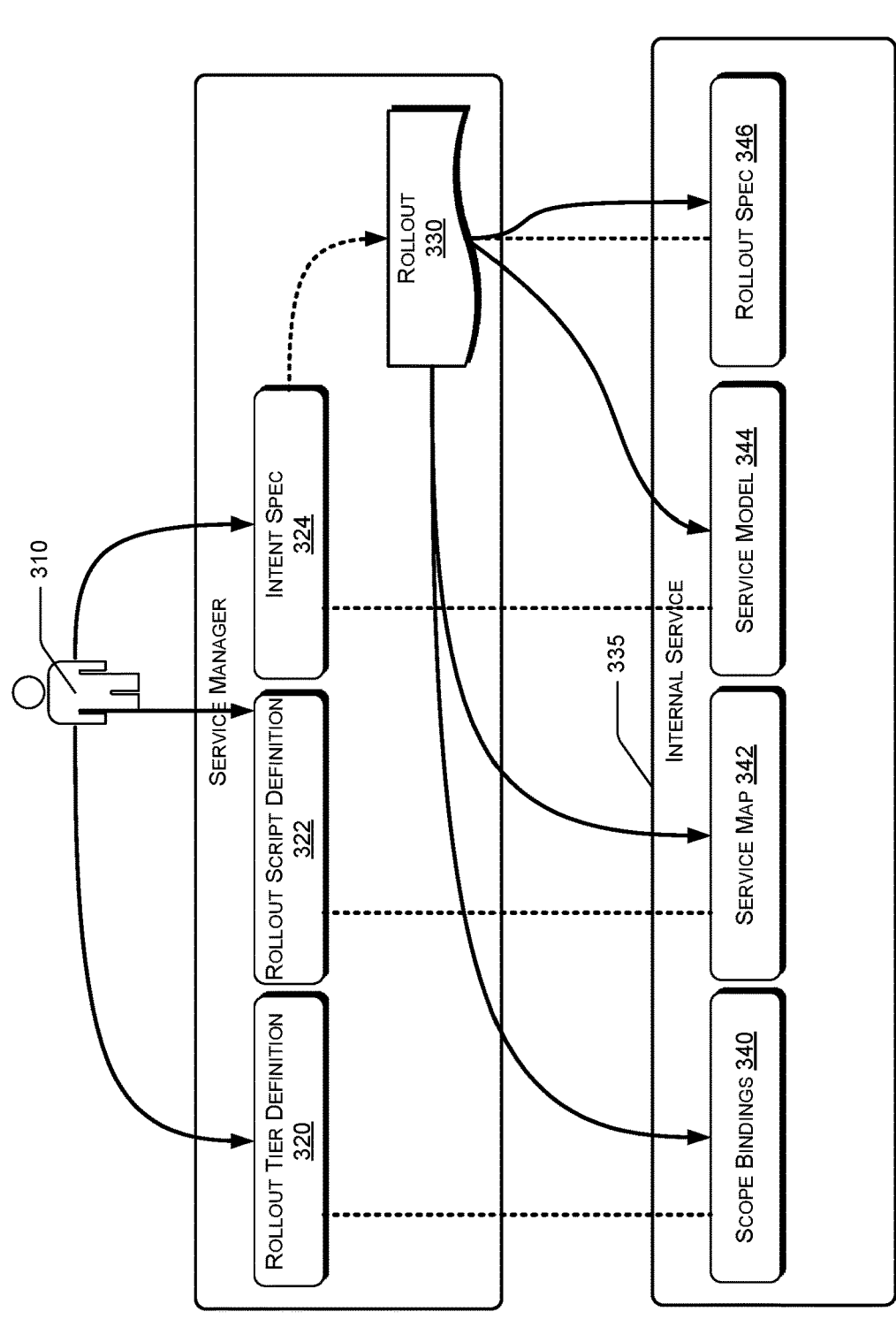
FIG. 3 is a diagram illustrating an example architecture in accordance with the present disclosure.

Referring to FIG. 3, illustrated is an example of inputs provided by an operator 310 including a rollout tier definition 320 which indicates specifications of what instances are to be updated, a rollout script definition 322 which includes policies that are to be followed, and an intent specification 324 which indicates what changes to make a high level. The rollout tier definition 320, rollout script definition 322, and intent specification 324 are used to generate the rollout rules and instructions 330. In an embodiment, the rollout management engine may generate the rollout rules and instructions 330. A workflow engine (not shown) can be part of an internal service 335 and may implement the rollout rules and instructions 330 in a specified order. The workflow engine may implement scope bindings 340 including connection or configuration information for accessing services or resources, service map 342 including a representation of services or components and their dependencies, service model 344 including a description of the functionality, behavior, and interfaces of services in the target environment, and rollout specification 346.

The following provides example use cases illustrating the principles described herein:

In an example, a complex service is split into multiple service instances (SIs). Two examples with similar characteristics include a 5G core spread across multiple edge sites, and a centralized voice mail service that is spread across multiple regions.

These SIs all apply a configuration that in normal operation, when no changes are rolling out, should be the same across all SIs. This configuration is declarative. The configuration comprises a comprehensive set of features including what software version is in use, and the low-level configuration parameters. However, the configuration is segmented, so different categories of the configuration are stored separately, and the configuration for each SI is the union of all the configurations that it uses.

The configuration is stored in a configuration resource, and each SI has pointers to which configuration resource it is using. The resource can be any resource including a table in a database or similar. SIs act as the unit of configuration change or upgrade.

Any change is made in a controlled order with gates, which can be, for example, "SI 1, then test that SI 1 is working, then SI 2, then wait 2 hours then require manual confirmation to proceed, then . . . " In some implementations, the specification of the ordering and steps in between SIs is configured in the rollout script definition, which encodes the policies.

In some implementations, tiers represent groups of sites. An example policy can state "do all the test only sites first, then do the low traffic sites, then do the high traffic sites." The full set of SIs across sites provide a logical service but failure of an SI does not break the service as a whole. For the 5G service, a broken edge site might mean that one radio mast stops working or similar, and there is still a possibility that a caller can use another mast. For the voice mail example, failure of an SI could mean that voicemails cannot be deposited in that region. However, voicemails may be deposited in another SI in another region, and so the service continues to operate. As a result, a change can be rolled out without the risk of the entire service failing if, for example, a faulty software update or configuration change is applied.

A software upgrade can be interrupted by a certificate change. In this example, an operator is making a change to a software version and is interrupted by the need to replace some certificates that have expired. The following is an example flow of operations.

Assume that there are two configuration types, X and Y. Type X contains the software version, and type Y contains other parameters.

The system starts with all SIs referencing a configuration resource A of type X, with the "software version" field set to v1, and a configuration resource C of type Y.

The operator prepares to upgrade to v2.

A new configuration resource B of type X is created with the software version set to v2.

An intent specification is created, which is the declaration of intent.

The intent specification contains a reference to the desired state, in a format such as "this is a change of your type X config from A to B".

Because this is a potentially significant change, it is to be applied with a policy requiring a 48 hour interval between SIs.

The operator triggers the change.

The rollout management engine reads all of the SIs to find what configuration is being used. A rollout resource is created that defines the full list of steps to perform. In order for this to be executed correctly, given the definition above, all SIs must be using the same configuration resource A.

The operator confirms the rollout, and the rollout begins, applying changes to each SI in turn based on the pre-calculated rollout resource.

In the middle of the change, the security certificates approach expiration. The operator must roll out this urgent change more quickly, so the following is performed.

The rollout of the first configuration change is stopped.

A new configuration resource D of type Y is created with the certificates changed.

A declaration of intent is generated, which contains a reference to the desired state, in format "this is a change of your type Y config from C to D".

Because this is a safe and urgent change, it is to be applied with a policy requiring only a 1-hour interval between SIs.

The operator triggers the change to apply the new certificates.

The rollout management engine reads all of the SIs to determine what configuration is being used, and creates a rollout that defines the full list of steps and operations to perform.

The operator confirms, and the rollout begins, applying changes to each SI in turn.

The rollout completes and all SIs have their new certificates applied.

The system now has the new certificates, but does not have the upgraded software version, and the upgrade is to be resumed. The original intent already exists from previous steps, so the operator can continue by retriggering the change.

The rollout management engine reads all of the SIs to determine what configuration is being used, and compares the configuration with the expected and desired values from the intent specification.

The rollout management engine then creates a rollout that defines the full list of steps and operations to perform. The rollout management engine detects that some SIs have already been upgraded (to B, i.e., to v2) in previous steps, so the rollout management engine does not include these SIs in the list.

The operator triggers the rollout, which is effectively continued where it left off.

In another example use case, a conflicting change is illustrated.

This change is similar to the first use case above, except that the two changes clash. The initial intent is a major software version update from v1 to v2, and the update is halted to allow for a high priority upgrade. However, the intervening rollout is an emergency patch. This patch is represented by an intent which indicates that the desired change is that:

all SIs running v1 are updated to run v1.01 (the patched version of v1)

all SIs running v2 are updated to run v2.01 (the patched version of v2).

The rollout management engine detects which SIs need to be changed from v1 to v1.01 and which SIs need to be changed from v2 to v2.01.

After the emergency patch is rolled out, the system is in a mixed state of v1.01 and v2.01, and the major upgrade requires all SIs to be at v2.01. The operator therefore:

Updates the intent to indicate that all instances at v1.01 should be upgraded to v2.01

Triggers the rollout again, rolling out the change to the SIs that had not performed as part of the major software version update.

The rollout management engine is able to detect inconsistencies, and would have returned an error if asked to upgrade instances from v1 to v2, since there are SIs that are in state v1.01, which is neither state v1 or v2.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provides federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 4:
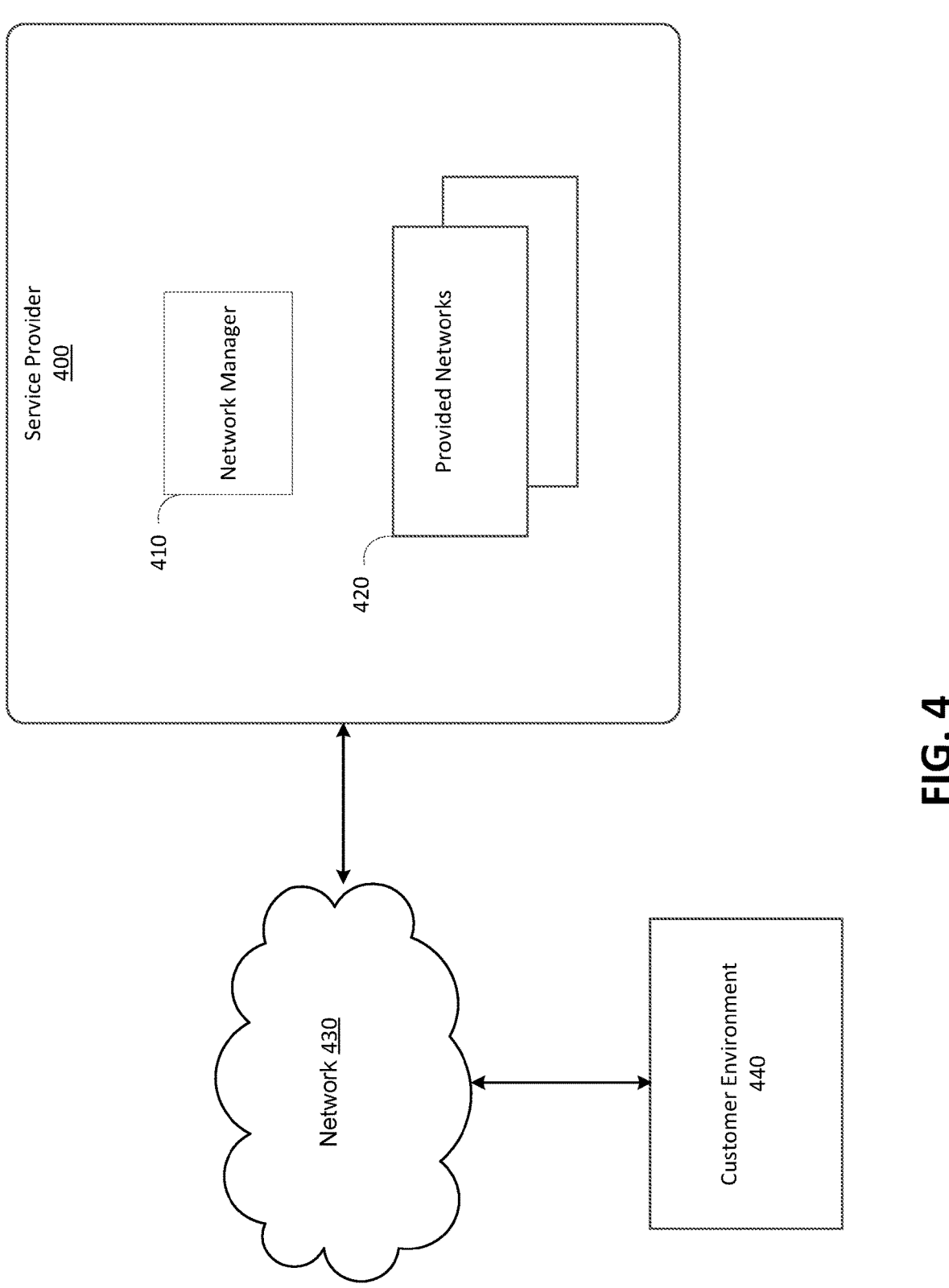
FIG. 4 is a diagram illustrating an example architecture in accordance with the present disclosure.

FIG. 4 illustrates an example computing environment in which the embodiments described herein may be implemented. FIG. 4 illustrates a service provider 400 that is configured to provide computing resources to users at customer environment 440. The customer environment 440 may have user computers that may access services provided by service provider 400 via a network 430. The computing resources provided by the service provider 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like.

Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor). Networking resources may include virtual networking, software load balancer, and the like. The virtual machines may be configured to execute applications, including Web servers, application servers, media servers, database servers, and the like. Data storage resources may include file storage devices, block storage devices, and the like.

Service provider 400 may have various computing resources including servers, routers, and other devices that may provide remotely accessible computing and network resources using, for example, virtual machines. Other resources that may be provided include data storage resources. Service provider 400 may also execute functions that manage and control allocation of network resources, such as a network manager 440. Various services can be provided via provided networks 420.

Network 430 may, for example, be a publicly accessible network of linked networks and may be operated by various entities, such as the Internet. In other embodiments, network 430 may be a private network, such as a dedicated network that is wholly or partially inaccessible to the public. Network 430 may provide access to computers and other devices at the customer environment 410.

The disclosed embodiments may be implemented in a mobile edge computing (MEC) environment implemented in conjunction with a 4G, 5G, or other cellular network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

It should be appreciated that although the embodiments disclosed above are discussed in the context of virtual machines, other types of implementations can be utilized with the concepts and technologies disclosed herein. It should be also appreciated that the network topology illustrated in FIG. 4 has been greatly simplified and that many more networks and networking devices may be utilized to interconnect the various computing systems disclosed herein. These network topologies and devices should be apparent to those skilled in the art.

Figure 5:
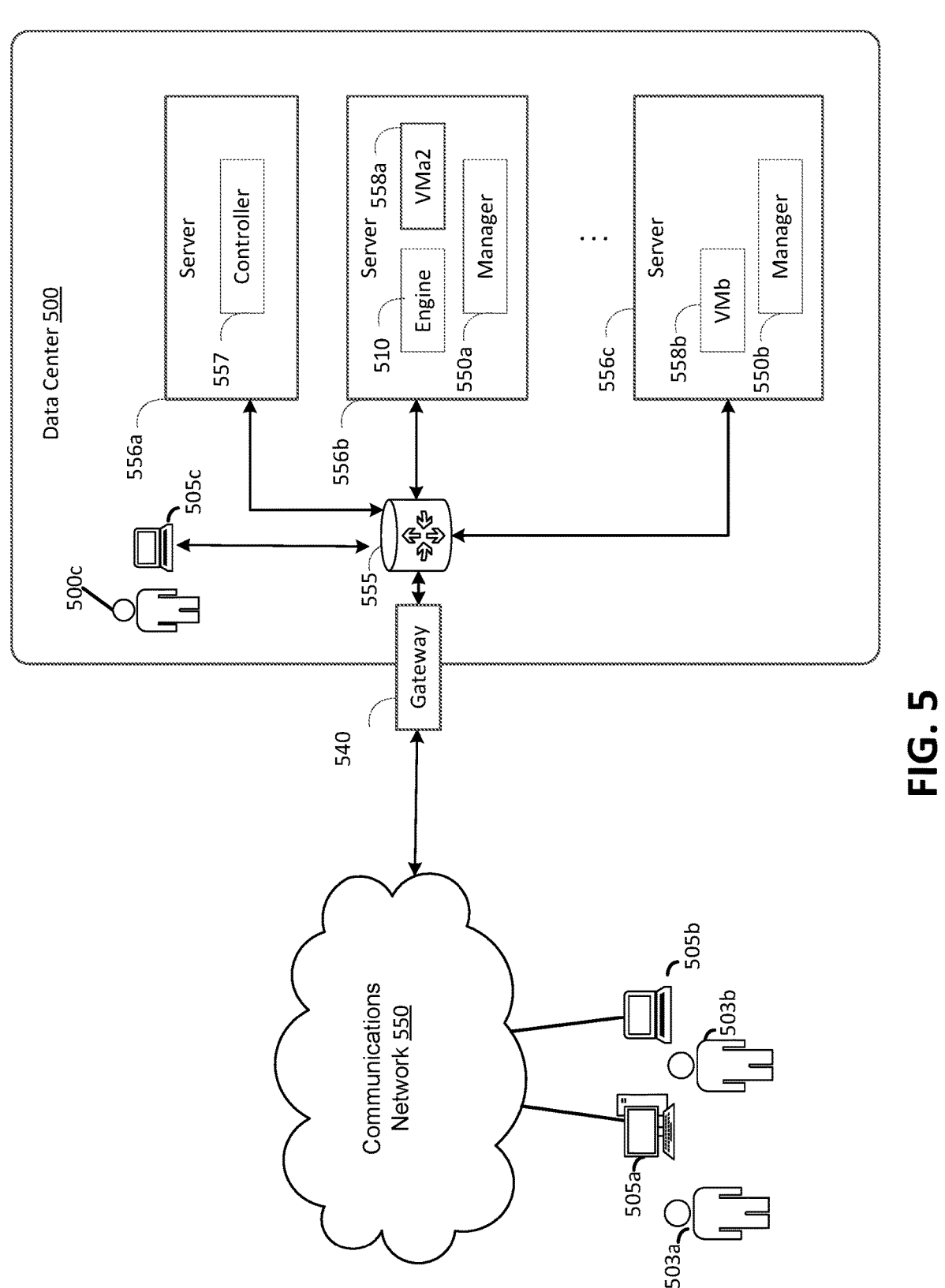
FIG. 5 is a diagram illustrating an example architecture in accordance with the present disclosure.

FIG. 5 illustrates an example computing environment in which the embodiments described herein may be implemented. FIG. 5 illustrates a data center 500 that is configured to provide computing resources to users 503a, 503b, or 503c (which may be referred herein singularly as "a user 503" or in the plural as "the users 503") via user computers 505a, 505b, and 505c (which may be referred herein singularly as "a computer 505" or in the plural as "the computers 505") via a communications network 520. The computing resources provided by the data center 500 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 500 may correspond service provider 400 of FIG. 4. Data center 500 may include servers 556a, 556b, and 556c (which may be referred to herein singularly as "a server 556" or in the plural as "the servers 556") that may be standalone or installed in server racks, and provide computing resources available as virtual machines 558a and 558b (which may be referred to herein singularly as "a virtual machine 558" or in the plural as "the virtual machines 558"). The virtual machines 558 may be configured to execute applications such as Web servers, application servers, media servers, database servers, and the like. Other resources that may be provided include data storage resources (not shown on FIG. 5) and may include file storage devices, block storage devices, and the like. Servers 556 may also execute functions that manage and control allocation of resources in the data center, such as a controller 557. Controller 557 may be a fabric controller or another type of program configured to manage the allocation of virtual machines on servers 556. In an embodiment, a rollout management engine 510 as described herein may be implemented in server 556b.

Referring to FIG. 5, communications network 520 may, for example, be a publicly accessible network of linked networks and may be operated by various entities, such as the Internet. In other embodiments, communications network 520 may be a private network, such as a corporate network that is wholly or partially inaccessible to the public.

Communications network 550 may provide access to computers 505. Computers 505 may be computers utilized by users 503. Computer 505a, 505b or 505c may be a server, a desktop or laptop personal computer, a tablet computer, a smartphone, a set-top box, or any other computing device capable of accessing data center 500. User computer 505a or 505b may connect directly to the Internet (e.g., via a cable modem). User computer 505c may be internal to the data center 500 and may connect directly to the resources in the data center 500 via internal networks. Although only three user computers 505a, 505b, and 505c are depicted, it should be appreciated that there may be multiple user computers.

Computers 505 may also be utilized to configure aspects of the computing resources provided by data center 500. For example, data center 500 may provide a Web interface through which aspects of its operation may be configured through the use of a Web browser application program executing on user computer 505. Alternatively, a stand-alone application program executing on user computer 505 may be used to access an application programming interface (API) exposed by data center 500 for performing the configuration operations.

Servers 556 may be configured to provide the computing resources described above. One or more of the servers 556 may be configured to execute a manager 550a or 550b (which may be referred herein singularly as "a manager 550" or in the plural as "the managers 550") configured to execute the virtual machines. The managers 550 may be a virtual machine monitor (VMM), fabric controller, or another type of program configured to enable the execution of virtual machines 558 on servers 556, for example.

It should be appreciated that although the embodiments disclosed above are discussed in the context of virtual machines, other types of implementations can be utilized with the concepts and technologies disclosed herein.

In the example data center 500 shown in FIG. 5, a network device 555 may be utilized to interconnect the servers 556a and 556b. Network device 555 may comprise one or more switches, routers, or other network devices. Network device 555 may also be connected to gateway 540, which is connected to communications network 520. Network device 555 may facilitate communications within networks in data center 500, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 500 described in FIG. 5 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Turning now to FIG. 6, illustrated is an example operational procedure 600 for orchestrating an update to a computing network comprising a plurality of sites each comprising a plurality of computing nodes implementing a virtualized computing network managed by an orchestrator. Such an operational procedure can be provided by one or more components illustrated in FIGS. 1 through 5. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

Referring to FIG. 6, operation 601 illustrates receiving a high-level representation indicative of an intended updated state of the virtualized computing network. Operation 603 illustrates receiving a policy indicative of constraints for changes that are permitted in the virtualized computing network. Operation 605 illustrates determining a current state of the virtualized computing network.

Operation 607 illustrates based on the high-level representation, policy, and the current state of the virtualized computing network, generating a set of operations that are deployable in a specified portion of the virtualized computing network. In an embodiment, the set of operations configure the virtualized computing network to achieve the intended updated state of the virtualized computing network when deployed.

Operation 609 illustrates deploying the set of operations in the virtualized computing network. Operation 611 illustrates detecting a change to the current state of the virtualized computing network. Operation 613 illustrates in response to detecting the change to the current state of the virtualized computing network, pausing the deployment of the set of operations in the virtualized computing network.

Operation 615 illustrates based on the change to the current state of the virtualized computing network, updating the set of operations to achieve the desired updated state of the virtualized computing network. Operation 617 illustrates deploying the updated set of operations in the virtualized computing network.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine is described as running on a system, it can be appreciated that the routine and other operations described herein can be executed on an individual computing device or several devices.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 7:
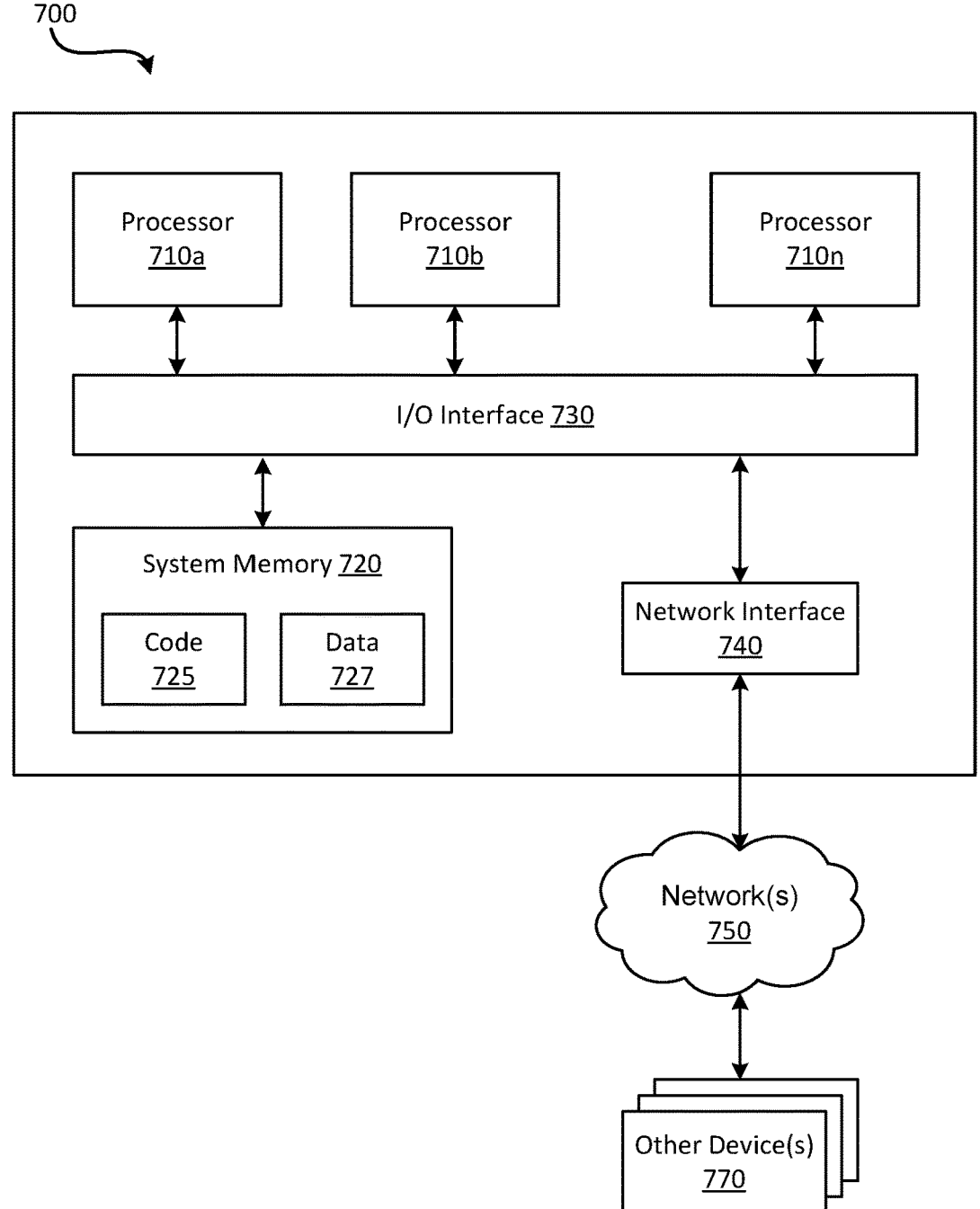
FIG. 7 is an example computing system in accordance with the present disclosure.

FIG. 7 illustrates a general-purpose computing device 700. In the illustrated embodiment, computing device 700 includes one or more processors 710*a*, 710*b*, and/or 710*n* (which may be referred herein singularly as "a processor 710" or in the plural as "the processors 710") coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 727.

In one embodiment, I/O interface 730 may be configured to coordinate I/O traffic between the processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 740 may be configured to allow data to be exchanged between computing device 700 and other device or devices 770 attached to a network or network(s) 750, such as other computer systems or devices as illustrated in FIGS. 1 through 5, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method of orchestrating an update to a computing network comprising a plurality of sites each comprising a plurality of computing nodes implementing a virtualized computing network managed by an orchestrator, the updating performed by a network manager configured to execute a series of operations in the virtualized computing network that coordinate the update at the plurality of sites, the method of comprising: receiving a high-level representation indicative of an intended updated state of the computing network;

receiving a policy indicative of constraints for changes that are permitted in the computing network;

determining a current state of the computing network;

based on the high-level representation, policy, and the current state of the computing network, generating a set of operations that are deployable in a specified portion of the computing network, wherein the set of operations configure the computing network to achieve the intended updated state of the computing network when deployed;

deploying the set of operations in the computing network;

detecting a change to the current state of the computing network;

in response to detecting the change to the current state of the computing network, pausing the deployment of the set of operations in the computing network;

based on the change to the current state of the computing network, updating the set of operations to achieve the intended updated state of the computing network; and deploying the updated set of operations in the computing network.

Clause 2: The method of clause 1, wherein the high-level representation is abstracted from underlying details of the computing network.

Clause 3: The method of any of clauses 1-2, wherein the network manager includes a mapping component configured to translate the high-level representation to the set of operations.

Clause 4: The method of any of clauses 1-3, further comprising performing a consistency check of the computing network.

Clause 5: The method of any of clauses 1-4, further comprising performing a consistency check of the computing network subsequent to deploying the set of operations.

Clause 6: The method of any of clauses 1-5, wherein the generating the set of operations comprises resolving dependencies between the high-level representation and resources in the computing network.

Clause 7: The method of clauses 1-6, further comprising in response to receiving a revision to the high-level representation, updating the set of operations to effect the revision.

Clause 8: The method of any of clauses 1-7, wherein the revision is received after some of the set of operations have been executed.

Clause 9: A system comprising:

one or more processors; and a memory in communication with the one or more processors, the memory having computer-readable instructions stored thereupon that, when executed by the one or more processors, cause the system to perform operations comprising:

receiving an input including a high-level representation that identifies an update to a computing network implemented across a plurality of sites each comprising a plurality of computing nodes, the update performed by a network manager configured to execute a series of operations across the plurality of sites, the input further including a policy indicative of constraints for changes that are permitted in the computing network and a current state of the computing network;

based on the high-level representation, policy, and the current state of the computing network, generating a set of operations that are deployable in a specified portion of the computing network, wherein the set of operations configure the computing network to achieve the update to the computing network when deployed; and deploying the set of operations in the computing network.

Clause 10: The system of clause 9, further comprising computer-readable instructions that, when executed by the one or more processors, cause the system to perform operations comprising:

detecting a change to the current state of the computing network;

in response to detecting the change to the current state of the computing network, pausing the deployment of the set of operations in the computing network;

based on the change to the current state of the computing network, updating the set of operations to achieve the update to the computing network; and deploying the updated set of operations in the computing network.

Clause 11: The system of any of clauses 9 and 10, wherein the high-level representation is abstracted from underlying details of the computing network.

Clause 12: The system of any of clauses 9-11, wherein the network manager includes a mapping component configured to translate the high-level representation to the set of operations.

Clause 13: The system of any clauses 9-12, further comprising computer-readable instructions stored thereupon that, when executed by the one or more processors, cause the system to perform operations comprising performing a consistency check of the computing network prior to effecting the update.

Clause 14: The system of any clauses 9-13, wherein the generating the set of operations comprises resolving dependencies between the high-level representation and resources in the computing network.

Clause 15: The system of any clauses 9-14, further comprising computer-readable instructions that, when executed by the one or more processors, cause the system to perform operations comprising in response to receiving a revision to the high-level representation, updating the set of operations to effect the revision.

Clause 16: The system of any clauses 9-15, wherein the revision is received after some of the set of operations have been executed.

Clause 17: A computer-readable storage medium having computer-executable instructions stored thereupon which, when executed by one or more processors of a system, cause the system to perform operations comprising:

receiving a configuration file that identifies a high-level representation indicative of an intended updated state of a virtualized computing network implemented across a plurality of sites each comprising a plurality of computing nodes, the configuration file further including a policy indicative of constraints for changes that are permitted in the virtualized computing network and a current state of the virtualized computing network;

based on the high-level representation, policy, and the current state of the virtualized computing network, generating a set of operations that are deployable in a specified portion of the virtualized computing network, wherein the set of operations configure the virtualized computing network to achieve the intended updated state of the virtualized computing network when deployed; and deploying the set of operations in the virtualized computing network.

Clause 18: The computer-readable storage medium of clause 17, wherein the set of operations are abstracted from underlying details of user-specific configurations of the virtualized computing network.

Clause 19: The computer-readable storage medium of any of clauses 17 and 18, wherein the generating the set of operations is performed by a network manager configured to translate the high-level representation to the set of operations.

Clause 20: The computer-readable storage medium of any of clauses 17-19, wherein the generating the set of operations comprises resolving dependencies between the high-level representation and resources in the virtualized computing network.

The invention claimed is:

1. A method of orchestrating an update to a computing network comprising a plurality of sites each comprising a plurality of computing nodes implementing a virtualized computing network managed by an orchestrator, the updating performed by a network manager configured to execute a series of operations in the virtualized computing network that coordinate the update at the plurality of sites, the method of comprising:

receiving a high-level representation indicative of an intended updated state of the computing network related to deploying software updates across a plurality of sites in the computing network, the intended updated state indicative of an updated state to be effected by the software updates;

receiving a policy indicative of constraints for changes that are permitted in the computing network;

determining a current state of the computing network;

based on the high-level representation, policy, and the current state of the computing network, generating a set of operations that are deployable in a specified portion of the computing network, wherein the set of operations configure the computing network to achieve the intended updated state of the computing network when deployed, wherein the network manager includes a mapping component configured to translate the high-level representation to the set of operations;

deploying the set of operations in the computing network;

detecting a change to the current state of the computing network;

in response to detecting the change to the current state of the computing network, pausing the deployment of the set of operations in the computing network;

based on the change to the current state of the computing network, updating the set of operations to achieve the intended updated state of the computing network; and deploying the updated set of operations in the computing network.

2. The method of claim 1, wherein the high-level representation is abstracted from underlying details of the computing network.

3. The method of claim 1, further comprising performing a consistency check of the computing network.

4. The method of claim 1, further comprising performing a consistency check of the computing network subsequent to deploying the set of operations.

5. The method of claim 1, wherein the generating the set of operations comprises resolving dependencies between the high-level representation and resources in the computing network.

6. The method of claim 1, further comprising in response to receiving a revision to the high-level representation, updating the set of operations to effect the revision.

7. The method of claim 6, wherein the revision is received after some of the set of operations have been executed.

8. A system comprising:

one or more processors; and a memory in communication with the one or more processors, the memory having computer-readable instructions stored thereupon that, when executed by the one or more processors, cause the system to perform operations comprising:

receiving an input including a high-level representation indicative of an intended updated state of a computing network related to deploying a software update to the computing network implemented across a plurality of sites each comprising a plurality of computing nodes, the software update performed by a network manager configured to execute a series of operations across the plurality of sites, the input further including a policy indicative of constraints for changes that are permitted in the computing network and a current state of the computing network, the intended updated state indicative of an updated state to be effected by the software update;

based on the high-level representation, policy, and the current state of the computing network, generating a set of operations that are deployable in a specified portion of the computing network, wherein the set of operations configure the computing network to achieve the software update to the computing network when deployed, wherein the network manager includes a mapping component configured to translate the high-level representation to the set of operations; and deploying the set of operations in the computing network.

9. The system of claim 8, further comprising computer-readable instructions that, when executed by the one or more processors, cause the system to perform operations comprising:

detecting a change to the current state of the computing network;

in response to detecting the change to the current state of the computing network, pausing the deployment of the set of operations in the computing network;

based on the change to the current state of the computing network, updating the set of operations to achieve the update to the computing network; and deploying the updated set of operations in the computing network.

10. The system of claim 8, wherein the high-level representation is abstracted from underlying details of the computing network.

11. The system of claim 8, further comprising performing a consistency check of the computing network prior to effecting the software update.

12. The system of claim 8, wherein the generating the set of operations comprises resolving dependencies between the high-level representation and resources in the computing network.

13. The system of claim 8, further comprising computer-readable instructions that, when executed by the one or more processors, cause the system to perform operations comprising in response to receiving a revision to the high-level representation, updating the set of operations to effect the revision.

14. The system of claim 13, wherein the revision is received after some of the set of operations have been executed.

15. A computer-readable storage medium having computer-executable instructions stored thereupon which, when executed by one or more processors of a system, cause the system to:

receiving a configuration file that identifies a high-level representation indicative of an intended updated state of a virtualized computing network implemented across a plurality of sites each comprising a plurality of computing nodes, the intended updated state related to deploying software updates, the intended updated state indicative of an updated state to be effected by the software updates, the configuration file further including a policy indicative of constraints for changes that are permitted in the virtualized computing network and a current state of the virtualized computing network;

based on the high-level representation, policy, and the current state of the virtualized computing network, generating a set of operations that are deployable in a specified portion of the virtualized computing network, wherein the set of operations configure the virtualized computing network to achieve the intended updated state of the virtualized computing network when deployed, wherein the generating the set of operations is performed by a network manager configured to translate the high-level representation to the set of operations; and deploying the set of operations in the virtualized comput-
ing network.

16. The computer-readable storage medium of claim 15,
wherein the set of operations are abstracted from underlying
details of user-specific configurations of the virtualized 5
computing network.

17. The computer-readable storage medium of claim 15,
wherein the generating the set of operations comprises
resolving dependencies between the high-level representa-
tion and resources in the virtualized computing network. 10

\*    \*    \*    \*    \*